United States Patent
Barboni et al.

(10) Patent No.: US 11,754,296 B2
(45) Date of Patent: Sep. 12, 2023

(54) SYSTEM AND METHOD FOR CONTROLLING A FLUID VECTOR TEMPERATURE IN ORDER TO HEAT A BUILDING

(71) Applicant: ALPERIA GREEN FUTURE S.R.L., Bolzano (IT)

(72) Inventors: Luca Barboni, Falconara Marittima (IT); Giorgia Farella, Padua (IT); Giovanni Bartucci, Soave (IT); Alessandro Fonti, Monte San Pietrangeli (IT); Francesco Cocchioni, Camerino (IT); Alessandro Bellini, Montecchia di Crosara (IT)

(73) Assignee: ALPERIA GREEN FUTURE S.r.l., Bolzano (IT)

( * ) Notice: Subject to any disclaimer, the term of this patent is extended or adjusted under 35 U.S.C. 154(b) by 395 days.

(21) Appl. No.: 17/272,781

(22) PCT Filed: Jul. 19, 2019

(86) PCT No.: PCT/IB2019/056203
§ 371 (c)(1),
(2) Date: Mar. 2, 2021

(87) PCT Pub. No.: WO2020/065417
PCT Pub. Date: Apr. 2, 2020

(65) Prior Publication Data
US 2021/0317998 A1   Oct. 14, 2021

(30) Foreign Application Priority Data
Sep. 28, 2018 (IT) .......... 102018000009019

(51) Int. Cl.
*F24D 19/00* (2006.01)
*F24D 19/10* (2006.01)
(Continued)

(52) U.S. Cl.
CPC .......... *F24D 19/1033* (2013.01); *F24D 3/02* (2013.01); *F24D 19/0012* (2013.01);
(Continued)

(58) Field of Classification Search
CPC .... F24D 19/1033; F24D 3/02; F24D 19/0012; F24D 2220/0235; F24D 2220/042; F24D 19/1015; G05B 19/042; G05B 2219/2614
See application file for complete search history.

(56) References Cited

U.S. PATENT DOCUMENTS 5,556,027 A * 9/1996 Friedrich .............. F24D 19/1033
236/99 E
8,200,344 B2   6/2012 Li et al.
(Continued)

FOREIGN PATENT DOCUMENTS

DE          28 11 153 A1    9/1979
DE    10 2008 040436 A1    2/2009
(Continued)

OTHER PUBLICATIONS

International Search Report and Written Opinion dated Nov. 15, 2019 in corresponding International application No. PCT/IB2019/056203; 9 pages.

(Continued)

*Primary Examiner* — Michael W Choi
(74) *Attorney, Agent, or Firm* — Maier & Maier, PLLC (57) ABSTRACT

A system for heating a building, including a heat generator to heat a carrier fluid, at least one radiating element for transferring heat to a thermal load included in a building, a delivery conduit for transferring the carrier fluid from the heat generator to the radiating element, a return conduit for transferring the carrier fluid from the radiating element to the heat generator, a three-way valve arranged along the delivery conduit and connected to the return conduit, the three-way valve being operable to mix the carrier fluid in the delivery conduit to the carrier fluid in the return conduit, a plurality of temperature sensors arranged to measure the temperature of the carrier fluid and a temperature of the environment outside the building, and a control unit operatively connected to the heat generator, to the three-way valve and to the temperature sensors.

15 Claims, 6 Drawing Sheets

(51) Int. Cl.
*F24D 3/02* (2006.01)
*G05B 19/042* (2006.01)

(52) U.S. Cl.
CPC .... *G05B 19/042* (2013.01); *F24D 2220/0235* (2013.01); *F24D 2220/042* (2013.01); *G05B 2219/2614* (2013.01)

(56) References Cited

U.S. PATENT DOCUMENTS

| | | | |
|---|---|---|---|
| 8,200,345 | B2 | 6/2012 | Li et al. |
| 9,982,903 | B1 | 5/2018 | Ridder et al. |
| 2011/0276180 | A1 | 11/2011 | Seem |
| 2013/0284818 | A1* | 10/2013 | Hayashida ............... F24D 3/18 237/56 |
| 2016/0132027 | A1 | 5/2016 | Li et al. |
| 2017/0176954 | A1 | 6/2017 | Salsbury et al. |
| 2018/0039292 | A1* | 2/2018 | van Berkel ............. F24F 11/46 |

FOREIGN PATENT DOCUMENTS

| | | | |
|---|---|---|---|
| EP | 2 442 052 A1 | 4/2012 |
| GB | 2 068 601 A | 8/1981 |

OTHER PUBLICATIONS

Sava Marinkov, Bram de Jager, and Maarten Steinbuch, "Extremum Seeking Control With Adaptive Disturbance Feedforward", IFAC Proceedings Volumes, vol. 47, Issue 3, 2014, pp. 383-388.

* cited by examiner

SYSTEM AND METHOD FOR CONTROLLING A FLUID VECTOR TEMPERATURE IN ORDER TO HEAT A BUILDING

TECHNICAL FIELD

The present invention refers to the field of systems for controlling the temperature of a building. In particular, the invention refers to a system for heating a building, like for example a residential building.

BACKGROUND

Current automated management technologies make it possible to implement highly efficient temperature control systems or can be associated with pre-existing temperature control systems to optimise the performance thereof.

In both cases, the temperature control systems are managed so as to ensure a desired temperature in one or more rooms of the building—for example, in one or more housing units of the building and/or in single rooms thereof—minimizing the energy consumption of the system. Consequently, the operating cost of the system and the polluting emissions of such a temperature control system are also minimized, with clear economic and environmental benefits.

For example, American U.S. Pat. No. 8,200,344 describes an extremum seeking control (ESC), which optimizes a control process of an air treatment HVAC system. In particular, the system is reset whenever a rapid change in operation of the system is detected.

In this case, the control system repeats an initialisation and ESC implementation procedure, at every change of operation of the system.

American U.S. Pat. No. 8,200,345 also describes a method for controlling a HVAC system based on ESC. In this case, a procedure is described for solving a so-called 'saturation condition of the actuator' which occurs when the ESC algorithm imposes on a damper of the system an operating condition corresponding to a physical operating limit (for example valve completely open or closed).

In this case there is a limitation of the result of the ESC to avoid a valve being brought into a limit work condition, without any effect on the speed of convergence to an optimal value.

American patent application no. US 2011/0276180 describes a system for actuating a process that comprises a processing circuit that uses a self-optimizing control strategy to determine a relationship between an input and an output of the system. The processing circuit is configured to switch from the use of the self-optimizing control strategy to a different control strategy that operates based on the learnt relationship.

In this case a system is proposed that uses the ESC only in a preliminary step of its operation to select a control model based on the result provided by the ESC. Consequently, the proposed control system demonstrates practically zero adaptation capacity.

American patent application no. US 2016/0132027 describes an ESC switching controller that includes a communication interface configured to receive an output signal of a system and provide a plurality of input control signals to it. The controller comprises a demodulation module configured to extract from the output signal a performance gradient referred to a variable of interest for each of the input control signals. The controller comprises a stabilization module configured to stabilize the performance gradients extracted using a history of previous values of such performance gradients. The values generated bring the performance gradients towards zero. The controller comprises a perturbation module of the signal configured to perturb the input control signals adding a perturbation signal to each of them.

In other words, the results of the ESC are corrected empirically based on previous iterations, without impacting on the speed of convergence to the optimal result.

American patent application no. US 2017/0176954 describes a self-configuring ESC controller that comprises a generator of perturbations, a communication interface, a phase delay estimator, and a bandwidth estimator. The perturbation signal generator identifies a perturbation signal at a stored perturbation frequency and supplies it to a control input of a system through the communication interface. The estimators receive an output signal of the system and estimate a phase delay of the output signal and therefore a bandwidth based on the phase delay. The estimated bandwidth is then used to update the stored perturbation frequency.

In this case, the controller implements a complex estimation process to refine the operating parameters used by the ESC in every cycle to improve the precision of its operation.

Summarising, the HVAC systems of the documents indicated above implement variants of an ESC controller each time to optimise respective aspects of the operation of the ESC. However, none of the implemented controllers makes it possible to simplify and speed up the reaching of the optimum, substantially reducing the number of iterations necessary to determine such an optimum, in particular, without increasing a computational power necessary to reach the optimum quickly.

The article by Sava Marinkov, Bram de Jager, and Maarten Steinbuch having the title "Extremum Seeking Control With Adaptive Disturbance Feedforward", IFAC Proceedings Volumes, Volume 47, Issue 3, 2014, pages 383-388, describes an ESC including an anticipation branch based on multi-varied and orthogonal Tchebyshev polynomials to approximate a static mapping between perturbation and the optimal inputs of the ESC in order to define a perturbation to be applied to the controlled system capable of improving an accuracy and a speed of convergence of the ESC. In particular, such a system is used for controlling a turbine for generating electrical energy.

In other words, the article proposes an ESC that provides for estimating in advance the perturbation used by the ESC to identify the optimum so as to increase the speed of convergence in a system, i.e. a system for generating energy by turbine, characterised by very fast response times to variations in the characteristic parameters.

American U.S. Pat. No. 9,982,903 describes an HVAC system comprising a refrigerator, a heat exchanger that are mutually distinct and a controller. The refrigerator is configured to supply a mechanical cooling to a load to be cooled, when the HVAC system operates in a mechanical cooling state. The heat exchanger is configured to provide a free cooling, when the HVAC system operates in a free cooling state. The controller is configured to predict an external temperature of the air and switch from the operation in the mechanical cooling state to the free cooling if the predicted temperature is less than a threshold temperature at least for a minimum time period.

In this case, the HVAC system comprises two air temperature adjustment circuits that are activated alternately by the controller, which seeks to predict which of the two circuits is most advantageous to activate. Consequently, the HVAC system is particularly bulky and expensive. Moreover, the passage from inactivity to normal operation, and vice-versa, for both systems requires times in which there is efficiency below the optimum. Finally, frequent activations and turning off of the systems can accelerate the wearing of the components thereof, reducing the useful life and the efficiency of the system.

In conclusion, the Applicant has found that the lack in known solutions of a heating system for buildings capable of operating efficiently, in particular, minimising the consumption of the system, ensuring the robustness thereof, but at the same time capable of adapting quickly to changes due to external factors (changes in temperature and/or other environmental conditions) and/or internal factors (changes in the need for heat) of the building despite the high thermal inertia due to the size of the building to be heated.

SUMMARY

The purpose of the present invention is to overcome the drawbacks of the prior art.

In particular the purpose of the present invention is to have a system for heating a building capable of adapting quickly to changes in one or more thermal loads associated with the building to be heated, at the same time ensuring an efficient operation of the system.

A further purpose of the present invention is to have a control method that makes it possible to control a system for heating a building that makes it possible to respond quickly to a change in one or more thermal loads to be heated, ensuring efficient operation of the system.

Another purpose of the present invention is to have a control unit that can be associated with a heating system present in a building for controlling it so as to ensure a high response speed thereof to changes of one or more thermal loads and particularly efficient operation.

These and other purposes of the present invention are accomplished through a device incorporating the characteristics of the attached claims, which form an integral part of the present description.

In an embodiment, the system comprises a heat generator adapted to heat a carrier fluid, at least one radiating element suitable for transferring heat to a thermal load included in a building, a delivery conduit for transferring the carrier fluid from the heat generator to the radiating element, a return conduit for transferring the carrier fluid from the radiating element to the heat generator, a three-way valve arranged along the delivery conduit and connected to the return conduit, the three-way valve being operable to mix the carrier fluid in the delivery conduit to the carrier fluid in the return conduit. The system also comprises a plurality of temperature sensors arranged to measure the temperature of the carrier fluid and a temperature of the environment outside the building, and a control unit operatively connected to the heat generator, to the three-way valve and to the temperature sensors. The control unit is configured to control the system in the following way: a temperature of the carrier fluid in the delivery conduit downstream of the three-way valve and a temperature of the carrier fluid in the return conduit upstream of the three-way valve with respect to the direction of the flow of the fluid in the conduits are acquired. A temperature of the environment outside the building is also acquired. The control unit estimates a first target temperature of the carrier fluid in the delivery conduit downstream of the three-way valve, based on a simplified model of the system calculated as a function of the temperature of the external environment. Moreover, the control unit actuates at least one among the heat generator and the three-way valve to generate a periodic perturbation in the temperature of the carrier fluid downstream of the three-way valve and determines a second target temperature of the carrier fluid in the delivery conduit downstream of the three-way valve based on a temperature difference between the temperature of the carrier fluid in the delivery conduit and the temperature of the carrier fluid in the return conduit based on said perturbation. The first target temperature and the second target temperature are combined by the electronic unit to obtain a total target temperature, which actuates at least one among the heat generator and the three-way valve to bring the carrier fluid in the delivery conduit downstream of the three-way valve to the total target temperature. The control unit repeats the adjustment of the total temperature until a target temperature difference is reached between the temperature of the carrier fluid in the delivery conduit and the temperature of the carrier fluid in the return conduit.

Thanks to such a solution it is possible to adjust the temperature of the carrier fluid in the delivery conduit to minimize the temperature change of the carrier fluid in the outgoing conduit and in the return conduit, i.e. minimizing the heat transferred to the thermal load. In this way it is possible to effectively reduce the consumption of the system and, in particular, the achievement of the optimal work condition of the heating system is particularly quick and precise. Indeed, the first target temperature makes it possible to rapidly approach the optimum point that is then reached through the second target temperature that quickly converges—i.e. with a small number of iterations. Consequently, the control unit is capable of adjusting the operation of the heat generator and of the three-way valve in an optimal manner, despite the high thermal inertia of the buildings heated by the heating system.

In an embodiment, the control unit is configured for determining the second target temperature by implementing a control not based on a model, selected among perturb and observe, extremum seeking and sliding mode.

In this way, the temperature of the carrier fluid in the delivery conduit that makes it possible to optimise the operation of the heating system can be reached efficiently without using a complex model of the system and/or acquiring a high number of reference variables.

In particular, implementing a control that is not based on a model, preferably an extremum seeking control, allows the control unit to identify the reaching of the target temperature difference as a maximum or minimum point of the temperature difference between the temperature of the carrier fluid in the delivery conduit and the temperature as a function of the periodic perturbation in the temperature. In this way, the control unit operates efficiently with a low calculation power. Preferably, in the case of use of methods based on the calculation of the gradient for reaching the optimum point, the estimation of the gradient can be carried out both with filtering and phase coupling techniques or alternatively with adaptive filtering, like for example with the use of forgetting factor recursive least squares or Kalman filters.

In an embodiment, the control unit defines the simplified model as a relationship between the temperature difference of the carrier fluid in the conduits and the temperature of the carrier fluid in the delivery conduit adapted to the measured temperature of the environment outside the building.

In this way, the control unit is capable of quickly identifying the first target temperature for the carrier fluid in the delivery conduit downstream of the three-way valve. In particular, the adaptation of the model to the external temperature of the building makes it possible to anticipate changes in the thermal load due to changes of the external temperature, lowering the impact of the thermal inertia of the building.

Moreover, the heating system can comprise other sensors for evaluating environmental factors, like an irradiation sensor suitable for measuring a solar irradiation to which the building is subjected, to obtain a more accurate correction of the simplified model without leading to a substantial increase in complexity of the model. In this case, the control unit is configured to modify the simplified model of the system based on the measured solar irradiation—in combination with the external temperature measurement.

Additionally or alternatively, the control unit can store operating information of the system, like the progression of the temperatures of the carrier fluid and of the external temperatures periodically or continuously. The control unit defines the simplified model based on the analysis of at least part of the stored information.

In this way, the simplified model can be updated based on the actual operation of the system and/or on the environmental conditions to which the building is subjected.

Furthermore, the control unit can be configured to connect to an external unit to acquire meteorological information, like weather forecasts, and change the predictions made by the simplified model of the system based on the meteorological information acquired.

This makes it possible to further increase the speed of the system despite the thermal inertia of the building and ensures greater robustness to measurement disturbances of the system. For example, a comparison between the temperature measurements and predicted temperatures can make it possible to detect measurements that are incorrect and/or compromised by disturbances capable of reducing the efficiency of the system.

In an embodiment, the control unit is configured to detect a temperature associated with at least one selected portion of the building, and limit the total target temperature to a first limit value or increase the total target temperature to a second limit value to keep the temperature of the at least one selected portion of the building within a range of permitted values.

In this way it is possible to ensure, with this further level of certainty, that the heating system does not bring portions of the building to an excessively high or low temperature, so as to ensure a standard comfort level for the users and/or to ensure that standards relating to the heating of buildings are respected.

In detail, the control unit can comprise a controller connected to a sensor adapted to measure the temperature associated with one or more portions, or selected rooms of the building. In this case the controller is configured to determine the first limit value as an acceptable maximum value of the temperature of the carrier fluid in the delivery conduit that keeps the temperature of the selected rooms within a higher threshold value. Preferably, the temperature is measured in a room having an average temperature higher than an average temperature of the building.

In a dual manner, the control unit can comprise a controller connected to a sensor adapted to measure the temperature associated with other selected rooms of the building. In this case the controller is configured to determine the second limit value as an acceptable minimum value of the temperature of the carrier fluid in the delivery conduit that keeps the temperature of the selected rooms above a lower threshold value. Preferably, the temperature is measured in a room having an average temperature lower than an average temperature of the building.

In an embodiment, the control unit comprises a valve controller, connected to the three-way valve, which is configured to adjust an operating condition of the three-way valve so as to mix the carrier fluid from the heat generator and the carrier fluid in the return conduit to obtain the carrier fluid in the delivery conduit downstream of the three-way valve at the total target temperature.

Moreover, the control unit can comprise a temperature sensor connected to the delivery conduit to measure a temperature of the carrier fluid output from the heat generator, and a generator controller. The generator controller is connected to the heat generator, to the valve controller and to the temperature sensor and is configured to adjust the operation of the heat generator to change the temperature of the carrier fluid output from the heat generator so as to obtain the carrier fluid in the delivery conduit downstream of the three-way valve at the total target temperature with the three-way valve in a desired operating condition.

In this way, the control unit is capable of keeping the temperature of the carrier fluid in the delivery conduit downstream of the three-way valve at a desired value, such as to optimise the temperature difference of the carrier fluid in the two conduits, reducing the consumption of the boiler (and limiting the turning on and off steps thereof), at the same time, keeping the three-way valve in an optimal operating condition preferably such as to ensure a high response capacity of the heating system to changes in the thermal load.

Additionally, the controller can determine the optimal on-off switching conditions of the heat generator, which ensure the desired average temperature of the delivery fluid, but minimising the energy consumption of the generator, for example taking into account the energy impact of the pre-activation washing cycles in conventional boilers.

A different aspect of the present invention proposes a corresponding method for controlling a heating system. The method provides for:

a) acquiring a temperature of the carrier fluid in the delivery conduit downstream of the three-way valve with respect to the direction of the flow of the carrier fluid in the delivery conduit, b) acquiring a temperature of the carrier fluid in the return conduit upstream of the three-way valve with respect to the direction of the flow of the carrier fluid in the return conduit, c) acquiring a temperature of the environment outside the building, d) estimating a first target temperature of the carrier fluid in the delivery conduit downstream of the three-way valve, based on a simplified model of the system calculated as a function of the external temperature, e) actuating at least one among the heat generator and the three-way valve to generate a periodic perturbation in the temperature of the carrier fluid downstream of the three-way valve, f) determining a second target temperature of the carrier fluid in the delivery conduit downstream of the three-way valve based on a temperature difference between the temperature of the carrier fluid in the delivery conduit and the temperature of the carrier fluid in the return conduit based on said perturbation, g) combining the first target temperature and the second target temperature to obtain a total target temperature, h) actuating at least one among the heat generator and the three-way valve to bring the carrier fluid in the delivery conduit downstream of the three-way valve to the total target temperature, and i) reiterating steps e) to h) until a target temperature difference is reached between the temperature of the carrier fluid in the delivery conduit and the temperature of the carrier fluid in the return conduit.

Further characteristics and purposes of the present invention will become clearer from the following description.

BRIEF DESCRIPTION OF THE DRAWINGS

The invention will be described hereinafter with reference to some examples, provided for explaining and not limiting purposes, and illustrated in the attached drawings. These drawings illustrate different aspects and embodiments of the present invention and, where appropriate, reference numerals illustrating structures, components, materials and/or elements that are similar in different figures are indicated by similar reference numerals.

DETAILED DESCRIPTION OF THE EMBODIMENTS

Whereas the invention can undergo various modifications and alternative constructions, some preferred embodiments are shown in the drawings and will be described hereinafter in detail. However, it should be understood that there is no intention to limit the invention to the specific embodiment illustrated, but, on the contrary, the invention intends to cover all of the modifications, alternative constructions, and equivalents that are encompassed by the scope of the invention as defined in the claims.

The use of "for example", "etc.", "or" indicates non-exclusive alternatives without limitation unless otherwise indicated. The use of "includes" means "includes, but not limited to" unless otherwise indicated.

Figure 1:
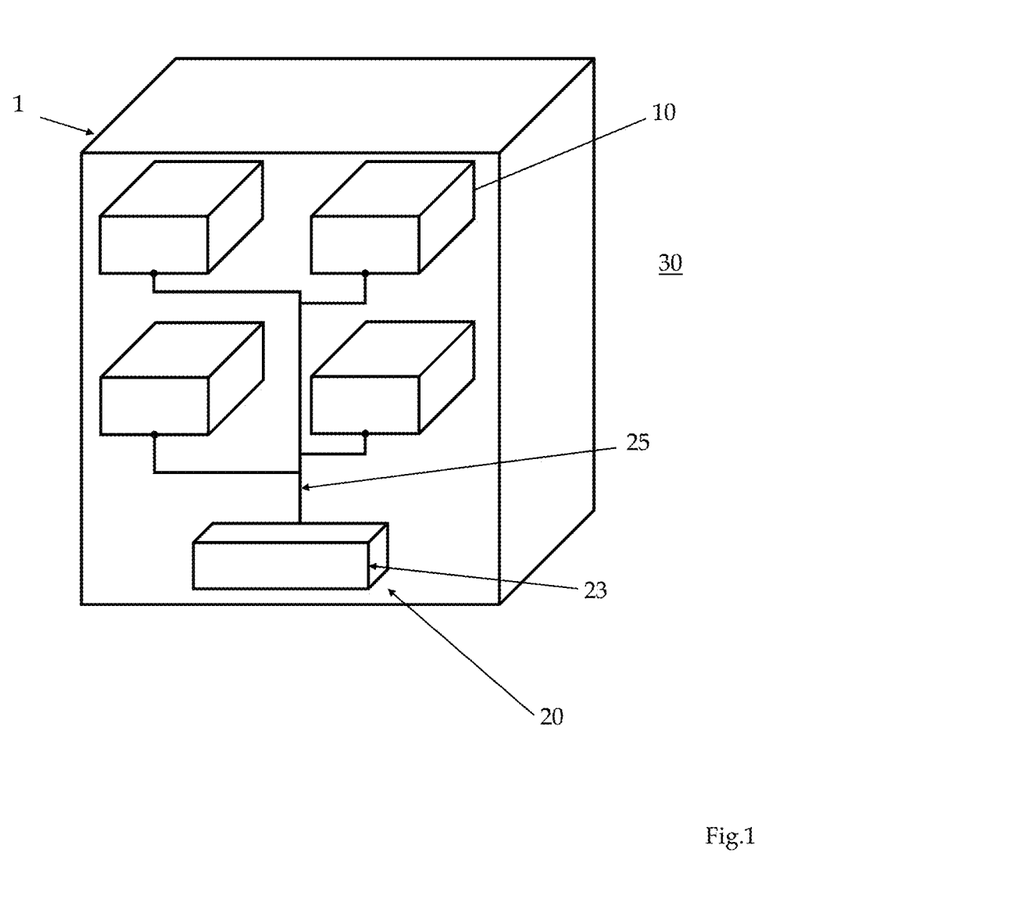
FIG. 1 is a basic scheme of a building in which a heating system according to an embodiment of the present invention is installed.
Figure 2:
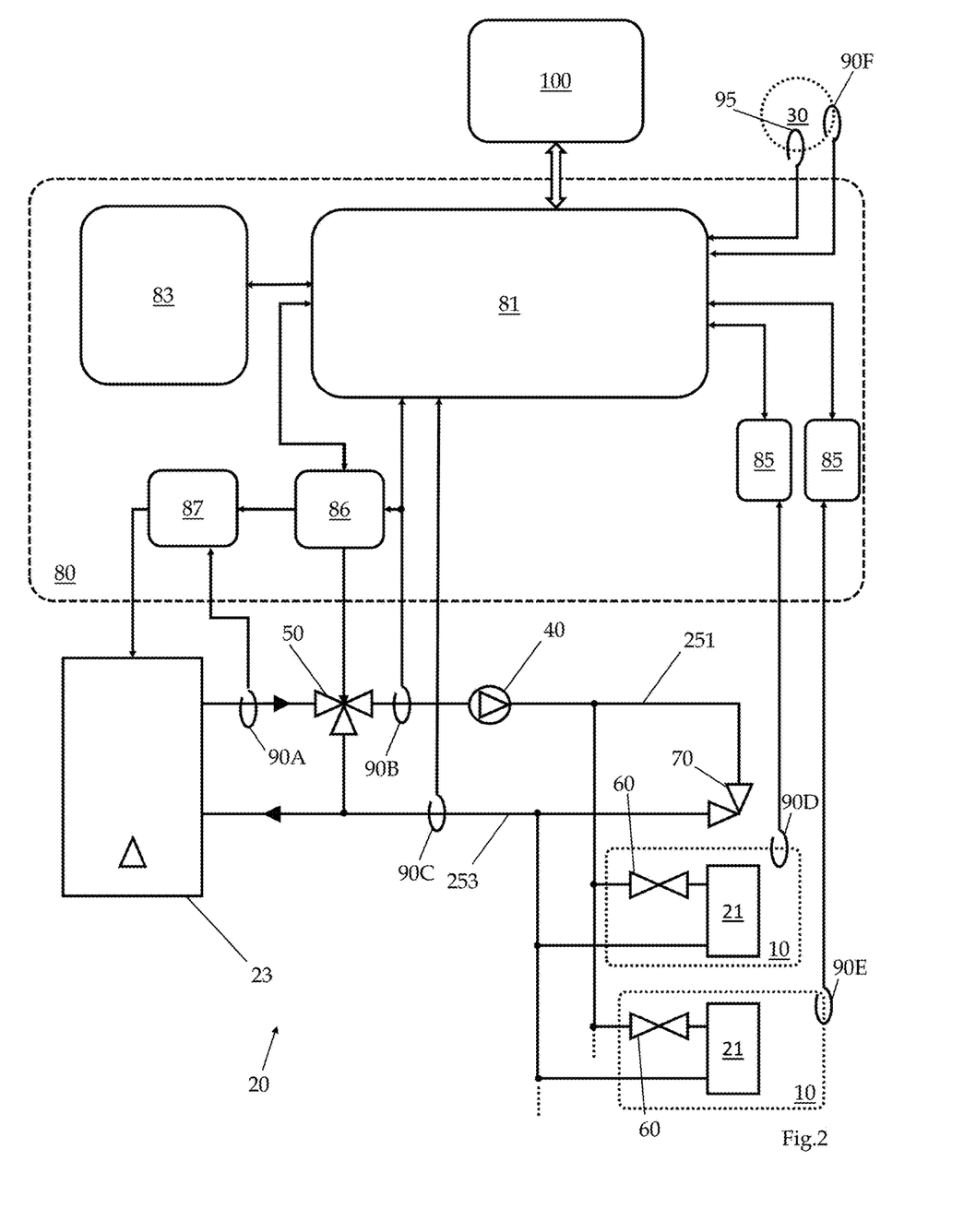
FIG. 2 is a block diagram of the heating system according to an embodiment of the present invention.

With reference to FIGS. 1 and 2, a building 1 is described in which a system for controlling the temperature in a building, in particular a heating system 20 according to an embodiment of the present invention, is implemented.

The building 1 comprises a plurality of portions of building separated from one another and that will be indicated with the term rooms 10 hereinafter for the sake of brevity. The rooms 10 can be of mutually different shape and volume and, moreover, groups of rooms 10 can be arranged at different heights inside the building. In the example in FIG. 1, four rooms 10 are shown, arranged on two levels. For example, the building 1 is a residential or commercial building, and each of the rooms 10 corresponds to a different apartment or office/commercial enterprise.

In order to adjust a temperature in each of such rooms 10, the heating system 20 comprises a plurality of radiating elements 21—for example radiators, fan coils, fan heaters, radiating floor and/or ceiling panels, etc. In particular, in each room 10 it is possible to arrange one or more radiating elements 21, each of which is in fluid connection with a heat generator 23—for example, a boiler—through a water distribution network 25. The distribution network 25 allows the circulation of a carrier fluid—for example, water—inside the heating system 20.

As known, the carrier fluid is heated by the heat generator 23 to a heating temperature $T_H$ and, when it reaches a radiating element 21, it gives up heat to the room 10 in order to obtain a desired room temperature $T_A$, in general different—for example, higher—than an external temperature $T_E$ of the external environment 30 in which the building 10 is located. In other words, a difference between the desired room temperature $T_A$ for the room 10 and the external temperature $T_E$ of the external environment 30 corresponds to a thermal load for the radiating element 21. Advantageously, the heating system 20 can consider other environmental factors to determine the thermal load, like for example solar irradiation, presence/absence, force and direction of wind, and presence/absence of precipitation, etc.

As can be seen in FIG. 2, the distribution network 25 comprises a delivery conduit 251 and a return conduit 253. The delivery conduit 251 allows a flow of 'hot' carrier fluid—schematically indicated by an arrow in FIG. 2—to be transferred from the heat generator 23 to the radiating elements 21, and possibly to other elements (not illustrated) of the heating system 20 like a boiler/cistern for hot sanitary water. On the other hand, the return conduit 253 allows a flow of 'cold' carrier fluid—schematically indicated by an arrow in FIG. 2—to be transferred from the radiating element 21 to the heat generator 23.

Advantageously, a pump 40 adapted to pump the carrier fluid through the distribution network 25 is arranged on the delivery conduit 251.

Moreover, a three-way valve 50, which is also coupled in fluid connection with the return conduit 253 is also arranged on the delivery conduit 251. For example, the three-way valve 50 is arranged between the heat generator 23 and the pump 40 along the delivery conduit 251. The three-way valve 50 can be actuated to mix the 'hot' carrier fluid output from the heat generator with the 'cold' carrier fluid in the return conduit 253, so as to adjust—in particular, lower—a temperature of the carrier fluid in the delivery conduit 251 downstream of the three-way valve 50, indicated as mixed carrier fluid hereinafter, with respect to the direction of the flow of the carrier fluid in the delivery conduit 251.

Preferably, a thermostat valve 60 is arranged on the delivery conduit 251 at each radiating element 21, so as to allow a user to adjust a heat exchanged by the radiating element 21 with the room 10 in which it is arranged.

Optionally, the delivery conduit 251 and the return conduit 253 can be selectively coupled in fluid connection through a by-pass valve 70 that connects together respective ends of the delivery conduit 251 and of the return conduit 253, in order to make a return path towards the heat generator 23 for the carrier fluid selectively available.

Additionally, the heating system 20 comprises an electronic control unit 80 operatively connected at least to the heat generator 23 and to the three-way valve 50 to control the operation of the heating system 20 as described in the rest of the present document.

A plurality of sensors 90 is connected to the control unit 80 to provide operating information of the heating system 20 and/or status information of the building 1. In the example considered, a first temperature sensor 90A is provided coupled with the delivery conduit 251 upstream of the three-way valve 50 to measure the temperature $T_H$ of the hot carrier fluid, a second temperature sensor 90B is provided coupled with the delivery conduit 251 downstream of the three-way valve 50 to measure the temperature $T_W$ of the mixed carrier fluid, and a third temperature sensor 90C is provided coupled with the return conduit 253 to measure the temperature $T_C$ of the cold carrier fluid, preferably upstream of the three-way valve 50.

Preferably, at least one sensor 90D is positioned in a room 10 that has an average room temperature $\overline{T_A}$ higher than an average temperature $T_{AM}$ of the entire building 1—for example, calculated as the average of the room temperatures $T_A$ of all of the rooms 10 of the building 1. Such a room 10 is preferably selected based on a position thereof inside the building 1. For example, the rooms 10 arranged at an intermediate height of the building 1 and having perimeter walls exposed to the south will have a higher average room temperature $\overline{T_A}$ with respect to the other rooms 10. Possibly, the average temperatures of each room can be detected during an implementation step of the system. Preferably, a plurality of rooms 10—for example, three—with higher average room temperature $\overline{T_A}$ is selected and a sensor 90D is arranged in each of them.

Moreover, at least one sensor 90E is positioned in a room 10 that has an average room temperature $\overline{T_A}$ lower than the average temperature $T_{AM}$ of the building 1. Also in this case, the room 10 is preferably selected based on a position thereof inside the building 1. For example, the rooms 10 arranged at ground level and having perimeter walls exposed to the north will have a lower average room temperature $\overline{T_A}$ with respect to the other rooms 10. Possibly, the average temperatures of each room can be detected during an implementation step of the system. Preferably, a plurality of rooms 10—for example, three—with a lower average room temperature $\overline{T_A}$ is selected and a sensor 90E is arranged in each of them.

Additionally, there is a temperature sensor 90F to detect the external temperature $T_E$ of the external environment 30. Preferably, the heating system 20 also comprises one or more sensors for acquiring other environmental parameters. For example an irradiation sensor 95 can be associated with the building 1 so as to measure a solar irradiation I to which the building 1 is subjected.

The control unit 80 comprises a processing module 81—for example, which includes one or more among a microcontroller, a microprocessor, an ASIC, an FPGA—a memory unit 83 and, preferably, one or more input controller modules 85 and 86 an output controller module 87—for example, comprising PID controllers. In general, the control unit 80 can comprise one or more ancillary circuits (not illustrated), like a circuit for generating a synchrony signal (clock), amplifiers for input/output signals, power supply circuitry, etc.

In the example considered, the processing module 81 is operatively coupled with the memory unit 83, with the controller modules 85 and 86, at least with the sensors 90B, 90C, 90F and 95. Advantageously, the processing module 81 can also be operatively connected to an external electronic entity 100—for example, a server of a company managing the heating system 20—through a suitable data transmission channel 105.

Moreover, a first input controller module 85 is connected to the temperature sensor 90D that measures a room temperature $T_{Amax}$ of the room 10 having an average room temperature $\overline{T_A}$ higher than an average temperature $T_{AM}$ of the building 1.

Similarly, a second input controller module 85 is connected to the temperature sensor 90E that measures a room temperature $T_{Amax}$ of the room 10 having an average room temperature $\overline{T_A}$ lower than an average temperature $T_{AM}$ of the building 1.

If the controllers 85 are not present, the sensors 90D and 90E are operatively coupled with the processing module 81.

Finally, the output controller module 87 is operatively coupled with the temperature sensor 90A and with the heat generator 23 and with the three-way valve 50.

With reference to the flow diagram of FIG. 3 the operation of the heating system 20 according to an embodiment of the present invention will now be described.

In general, the control unit 80 is configured to adjust the operation of the heating system 20 so as to bring and/or keep each room 10 to/at the desired room temperature $T_A$ reducing the consumption and/or the turning on/off cycles of the heat generator 30. For example, the desired room temperature $T_A$ can be set through a thermostat (not illustrated). Additionally or alternatively, one or more default room temperatures $T_A$ can be saved in the memory 83.

In particular, the control unit 80 acquires the external temperature $T_E$ and the irradiation measurement I from the sensors 90F and 95, respectively, and supplies them in input to a simplified model 1101 of the heating system 20.

Optionally, the simplified model 1101 can receive in input measurement provided by the other aforementioned sensors and/or information relating to weather forecasts—for example, predicted temperatures and irradiation conditions within a future time period—that the processing module 81 acquires from the external entity 100. Such measurements and information can be used to correct the simplified model or the results provided by it.

Advantageously, the simplified model 1101 can be defined at the end of an installation step of the heating system 20 and be stored in the memory 83. Additionally or alternatively, the simplified model 1101 can be defined or updated periodically based on functional parameters of the heating system stored in the memory 83 and measurements of the temperatures acquired through the sensors 90A-90C and/or by the thermostat valves 60.

In a preferred embodiment, the simplified model 1101 can be defined based on a relationship f between the temperature $T_W$ of the mixed fluid and a temperature difference $\Delta T$ between the temperature $T_W$ and the temperature $T_C$ of the cold carrier fluid as a function of the external temperature $T_E$ and of the irradiation I measured—and, possibly, other information acquired by other sensors and/or provided by the external entity 100.

Alternatively, the Applicant has determined that the parameters of the simplified model 1101 can be defined by means of linear regression, or alternatively, by means of classes of non-linear functions like, for example, non-linear ARX, or methods based on spectral analyses and cross-correlation or other methods for frequency analysis.

Additionally, the Applicant has determined that the simplified model 1101 can be corrected/updated during the operation of the heating system 20, recording in the memory 83 the performed measurements provided by the sensors 90, 95 and using such historical data as input variables, for example using a SARIMAX model to obtain a simplified model 1101 capable of taking into account a cyclical/seasonal nature to which the acquired measurements and, more in general, the thermal progression of the building 1 are subjected.

The simplified model 1101 created by the control unit 80 makes it possible to estimate a target temperature $T_{W1}$ to which to bring the mixed carrier fluid in the delivery conduit 251 downstream of the three-way valve 50. In the embodiment considered, the target temperature $T_{W1}$ makes it possible to bring the temperature difference $\Delta T$ between the temperature $T_W$ and the temperature $T_C$ of the carrier fluid in the two conduits 251 and 253, towards an optimal value $\Delta T_{OPT}$ which makes it possible to ensure the desired room temperature $T_A$ in one or more rooms 10 minimizing the temperature $T_H$ of the hot carrier fluid and/or minimizing the switching on/off of the heat generator 23. In an embodiment, the simplified model 1101 determines a target temperature $T_{W1}$ and allows a sub-optimal value $\Delta T_{SOPT}$ of the temperature difference $\Delta T$ to be reached, for example comprised between 75%-95% of the optimal value $\Delta T_{OPT}$. Preferably, the target temperature $T_{W1}$ is a substantially constant value so long as the values of the external temperature $T_E$ and of the irradiation I remain constant or within a predetermined tolerance range.

In detail, the simplified model 1101 can be configured to determine the target temperature $T_{W1}$ identifying an optimal work point on the relationship f between the temperature $T_W$ and the temperature difference $\Delta T$, as a function of the external temperature $T_E$ and the measured irradiation I. For example, the optimal work point can be identified as the point at which an angular coefficient—or a first derivative—of the relationship f changes from a first value, for example a maximum, to a second value, for example a lower value,—i.e., at an 'elbow' of the relationship f.

In parallel to the simplified model 1101, the control unit 80 creates a control procedure 1103 not based on a model that has the purpose of determining a variable target adjustment temperature $T_{W2}$ such as to make it possible to reach the optimal value $\Delta T_{OPT}$ and keep it dynamically against changes in the temperatures $T_W$ and $T_C$ of the carrier fluid in the conduits 251 and 253, the measurements of which are provided in input to the control procedure 1103. For example, the control procedure 1103 comprises a procedure selected among perturb and observe, extremum seeking and sliding mode. In a preferred embodiment, the control procedure 1103 provides for implementing an extremum seeking control procedure.

Figure 4:
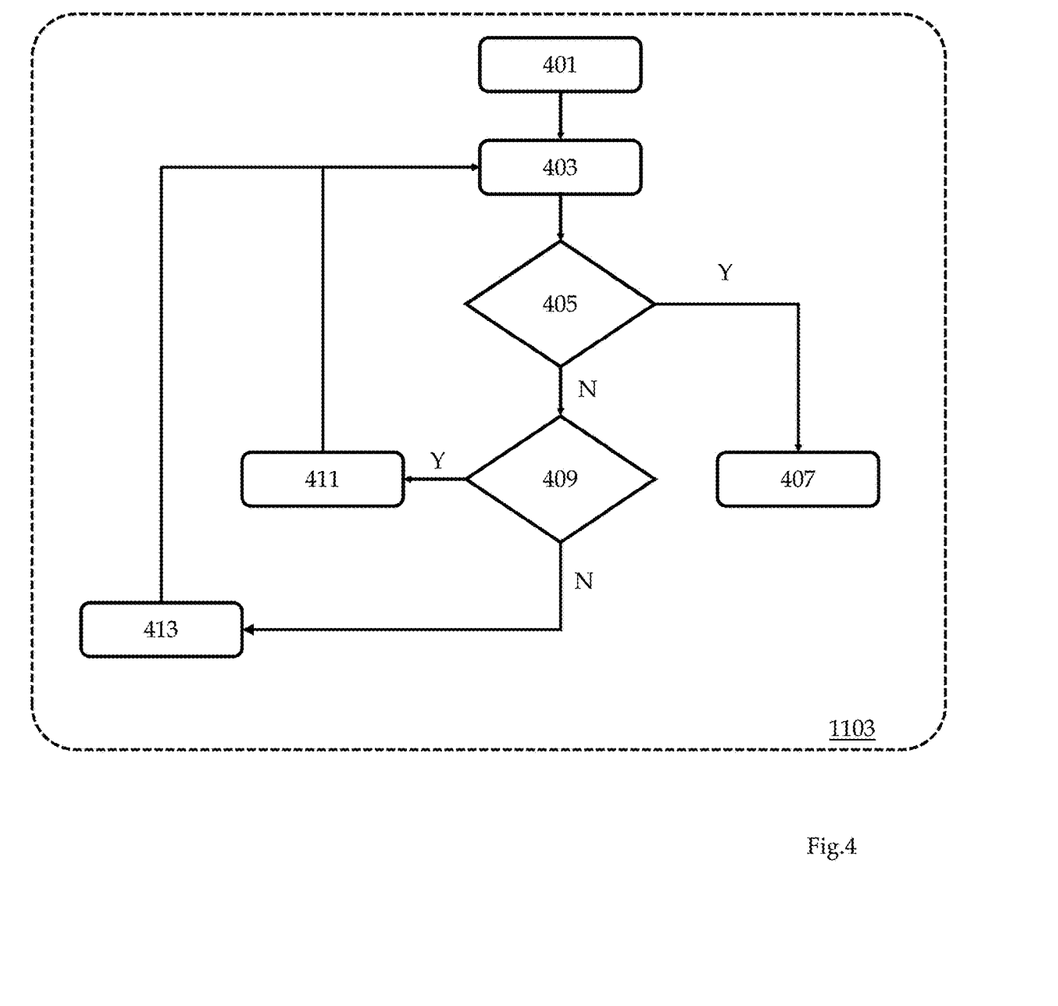
FIG. 4 is a flow diagram of a procedure for seeking an optimum value not based on a model included in the control procedure of FIG. 3.

With particular reference to the flow diagram of FIG. 4, the control procedure 1103 provides for supplying (block 401) a periodically variable adjustment temperature $T_{W2}$—for example, in a sinusoidal manner. Such an adjustment temperature $T_{W2}$ is used as reference to actuate the three-way valve 50 and/or the heat generator 23—through the respective controllers 86 and 87—as described hereinafter—so as to cause a corresponding perturbation in the temperature $T_W$ of the mixed carrier fluid.

Subsequently, the control procedure 1103 provides for monitoring (block 403) the temperature $T_W$ and the temperature $T_C$ of the carrier fluid in the two conduits 251 and 253, so as to identify a response of the heating system 20 to the perturbation determined by the adjustment temperature $T_{W2}$. In detail, the procedure 1103 verifies (decisional block 405) whether a maximum—or, alternatively, minimum—point corresponding to the optimal value $\Delta T_{OPT}$ has been reached. In the affirmative case (output branch Y of block 405) the adjustment temperature $T_{W2}$ allows the optimal value $\Delta T_{OPT}$ to be reached and it is kept unchanged (block 407) until there is a change in the temperatures $T_W$ and $T_C$ of the carrier fluid in the two conduits 251 and 253 that determines a temperature difference $\Delta T$ that differs from the optimal value $\Delta T_{OPT}$—possibly, outside of a tolerance range—for example, due to a change in heat exchange between one or more radiating elements 21 and the respective rooms 10.

Differently (output branch N of the block 405), the procedure 1103 identifies (decisional block 409) whether the adjustment temperature $T_{W2}$ must be increased (output branch Y of block 409) or decreased (output branch N of block 409) to reach the optimal value $\Delta T_{OPT}$ and consequently modifies (at block 411 or at block 413, respectively) the value of the adjustment temperature $T_{W2}$ before returning to block 403 to monitor the progression of the temperature measurements $T_W$ and $T_C$ of the carrier fluid in the two conduits 251 and 253 following the selected change.

Figure 3:
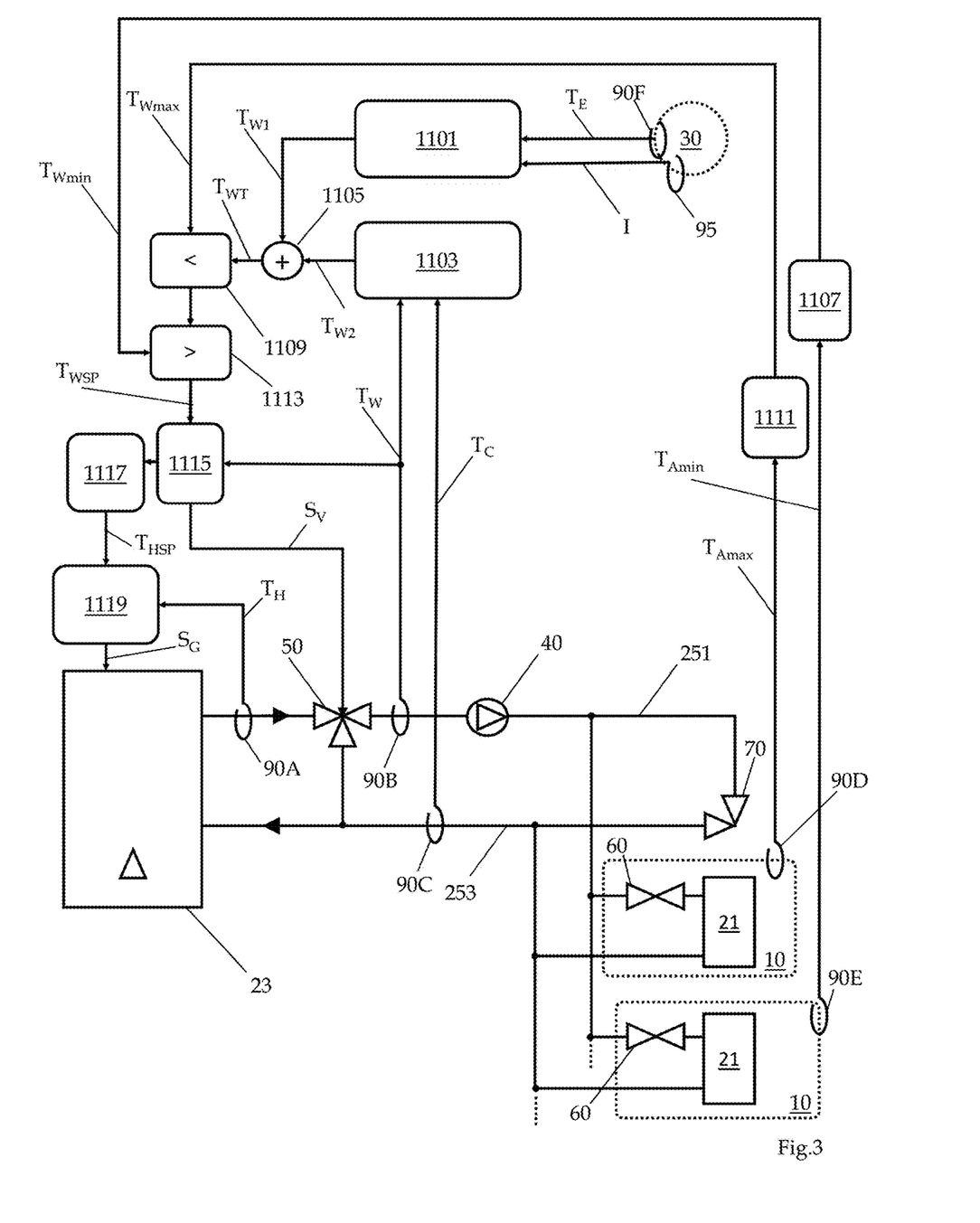
FIG. 3 is a flow diagram of a control procedure that can be implemented by the control unit of the heating system of FIG. 2.

Going back to the flow diagram of FIG. 3, the target temperature $T_{W1}$ and the adjustment temperature $T_{W2}$ are combined with each other to obtain a total temperature $T_{WT}$. For example, the temperatures $T_{W1}$ and $T_{W2}$ are added together (adding node 1105) to obtain the total temperature $T_{WT}$.

Preferably, the control unit 80 is configured to verify that the total temperature $T_{WT}$ thus obtained does not bring the room temperature $T_A$ of one or more rooms 10 outside of a permitted temperature range. For example, the control unit 80 verifies that the room temperatures $T_A$ are comprised between, or equal to, 18° C. and 22° C.—for example, in accordance with the legal limits, to limit the consumption of the system 20 and/or to limit polluting/greenhouse emissions of the system 20.

This operation is implemented thanks to the controllers 85 connected to the sensors 90D and 90E. In detail, one or more first controllers 85—one in the example of FIG. 3—monitor the room temperature measurement $T_A$ provided by respective sensors 90D—one visible in the example of FIG. 3—to detect a maximum room temperature $T_{Amax}$ in one or more of the rooms 10 that have an average room temperature $T_A$ higher than the average $T_{AM}$ of the building 1. For example, the average temperature $T_{AM}$ is determined by the processing module 81 based on the measurements provided by one or more sensors and/or thermostats in real time. Additionally or alternatively, one or more average temperatures $T_{AM}$ can be stored in the memory 83 obtained based on an analysis over time of the room temperatures $T_A$—carried out during the installation of the system 20 and/or afterwards.

The first controller 85 implements a procedure 1107—for example, a PID control—to determine a maximum acceptable value $T_{Wmax}$ of the temperature $T_W$ of the mixed carrier fluid that ensures that the temperature $T_{Amax}$ is not raised above a higher threshold value—for example, 22° C.

The acceptable maximum value $T_{Wmax}$ is compared (block 1109) with the total temperature $T_{WT}$, and the lower value of the two is selected.

Similarly, one or more second controllers 85—one in the example of FIG. 3—monitor the room temperature measurement $T_A$ provided by sensors 90E—one in the example of FIG. 3—to detect a minimum room temperature $T_{Amin}$ in one or more of the rooms 10 that have an average room temperature $T_A$ lower than an average temperature $T_{AM}$ of the building 1.

The second controller 85 implements a procedure 1111—for example, a PID control—to determine a minimum acceptable value $T_{Wmin}$ of the temperature $T_W$ of the mixed carrier fluid that ensures that the temperature $T_{Amin}$ is not lowered below a lower threshold value—for example, 18° C.

The minimum acceptable value $T_{Wmin}$ is compared (block 1113) with the temperature provided in output by block 1109—i.e., the total temperature $T_{WT}$, or the acceptable maximum value $T_{Wmax}$—and the greater value of the two is selected.

In other words, the control unit 80 provides in output block 1113 a reference temperature $T_{WSP}$ selected among the total temperature $T_{WT}$—in particular, the total temperature $T_{WT}$—, the acceptable maximum value $T_{Wmax}$ or the minimum acceptable value $T_{Wmin}$.

The reference temperature $T_{WF}$ is used to change the temperature difference $\Delta T$ between the temperature $T_W$ of the mixed carrier fluid and the temperature $T_C$ of the cold carrier fluid to reach the optimal value $\Delta T_{OPT}$. For this purpose, the control unit 80 actuates at least one among the heat generator 23 and the three-way valve 50 based on the selected reference temperature $T_{WF}$. In particular, the reference temperature $T_{WF}$ can be used to change the control of the heat generator 23 and/or to change the opening of the three-way valve 50 so as to change the proportion of hot carrier fluid and of cold carrier fluid that are mixed to form the mixed carrier fluid in the delivery conduit 251 downstream of the valve 50.

In the example considered, the selected reference temperature $T_{WF}$ is provided in input to the controller 86, which also receives the measurement of the temperature $T_W$ of the mixed carrier fluid. The controller 86 implements a valve adjustment procedure (block 1115) that generates a valve control signal $S_V$, which determines an open position of the three-way valve 50 based on the reference temperature $T_{WF}$ and on the current temperature $T_W$ of the mixed carrier fluid (provided by the sensor 90B). The valve control signal $S_V$ is provided to the three-way valve 50 to determine an operating condition—or opening—that adjusts the mixing between cold carrier fluid—at temperature $T_C$—and the hot carrier fluid—at temperature $T_H$—so that the temperature $T_W$ of the mixed carrier fluid corresponds to the selected reference temperature $T_{WF}$ (i.e. $T_W=T_{WF}$).

In this way, the control system 80 is capable of changing the temperature $T_W$ of the mixed carrier fluid in the conduit 253 downstream of the three-way valve 50 quickly, allowing the system 20 to respond quickly to changes in the thermal loads associated with the radiating elements 21.

The control system 80, in particular the generator controller 87, also implements a temperature adjustment procedure (block 1117) to adjust the temperature $T_H$ of the hot carrier fluid output from the heat generator 23 based on the operating condition of the three-way valve 50. In particular, the procedure 1117 receives in input the valve control signal $S_V$ and determines a hot reference temperature value $T_{HSP}$ to which the temperature $T_H$ of the hot carrier fluid can be brought. Advantageously, the procedure 1117 is configured for identifying the hot reference temperature value $T_{HSP}$ that allows the consumption of the heat generator 23 to be reduced.

The hot reference temperature value $T_{HSP}$ is provided in input to a generator adjustment procedure (block 1119)—for example, based on hysteresis—implemented by the generator controller 87. The generator adjustment procedure 1119 also receives in input the measurement of the temperature $T_H$ of the hot carrier fluid and is configured to provide in output a generator control signal $S_G$ suitable for bringing the temperature $T_H$ of the carrier fluid output to the hot reference temperature value $T_{HSP}$.

In the preferred embodiment, the hot reference temperature value $T_{HSP}$ is determined so as to allow the three-way valve 50 to be brought back into a desired operating condition. For example, the Applicant has identified a desired operating condition for the three-way valve 50 such that the carrier fluid in the delivery conduit 251 downstream thereof is given by a mixture comprising 80% hot carrier fluid and 20% cold carrier fluid. Analyses by the Applicant have highlighted that such an operating condition of the three-way valve 50 makes it possible to efficiently change the temperature $T_W$ of the mixed carrier fluid over a wide dynamic and, at the same time, ensures efficient operation of the heat generator 23.

Figure 5:
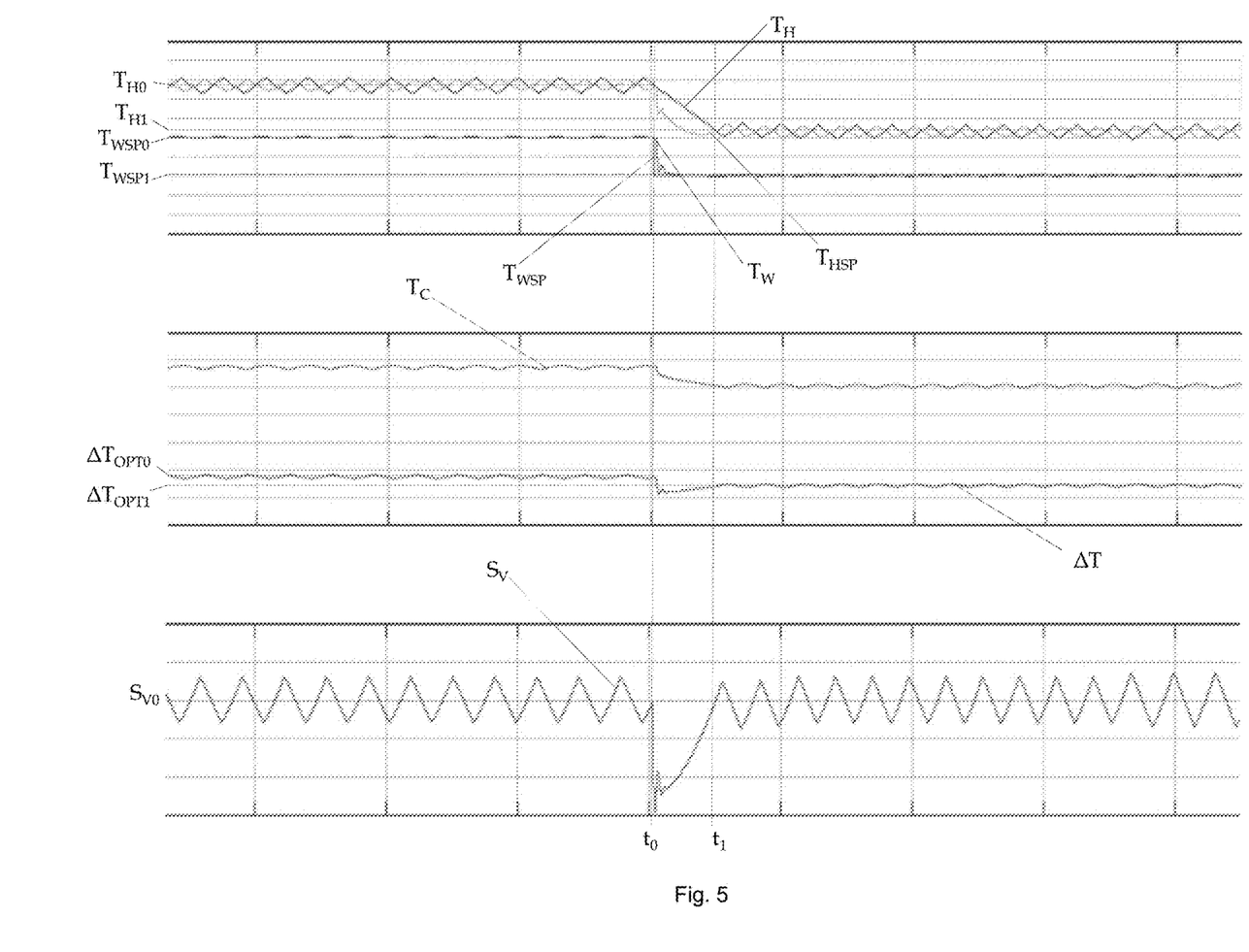
FIG. 5 illustrates graphs of the progression of operating parameters of the heating system according to an embodiment of the present invention.

An example combined adjustment of the temperature $T_H$ of the hot carrier fluid and of the operating condition of the three-way valve 50, is now described in reference to the graphs of FIG. 5.

Initially, the valve control signal $S_V$ oscillates around a value $S_{V0}$ corresponding to the desired operating condition of the three-way valve 50—as can be seen in FIG. 5.

Consequently, the temperature $T_W$ of the mixed carrier fluid reaches the neighbourhood of a first target value $T_{WSP0}$. In these conditions, the temperature difference $\Delta T$ approaches a first optimum value $\Delta T_{OPT0}$—oscillating in an extremely contained manner around such a value, as can be seen in FIG. 5.

When, at a time t0, there is a change to a second target value $T_{WSP1}$—for example, lower than the first target value $T_{WSP0}$ the valve adjustment procedure 1115 changes the valve control signal $S_V$—almost instantly—so as to change the mixing proportion of the hot carrier fluid and of the cold carrier fluid, so as to bring the temperature $T_W$ of the mixed carrier fluid substantially to the second target value $T_{WSP0}$. In the illustrated example, the valve control signal $S_V$ actuates the three-way valve 50 to substantially increase the proportion of cold carrier fluid and reduce the proportion of hot carrier fluid, thus reducing the value of the temperature $T_W$ of the mixed carrier fluid. In this way, the temperature difference $\Delta T$ quickly reaches a second optimal value $\Delta T_{OPT1}$.

Substantially in parallel to the change of the operating condition of the three-way valve 50, the temperature adjustment procedure 1117 implemented by the generator controller 87 dynamically changes the hot temperature reference value $T_{HSP}$. Based on the hot temperature reference value $T_{HSP}$ the generator adjustment procedure 1119 adjusts the operation of the heat generator 23 so as to obtain the hot carrier fluid substantially at a second temperature value $T_{H1}$—lower than the first temperature value $T_{H0}$ in the example considered—that makes it possible to bring the three-way valve 50 to operate in the desired operating condition.

In particular, the change of the temperature $T_H$ of the hot carrier fluid consequently changes the temperature $T_W$ of the mixed carrier fluid downstream of the three-way valve 50. The valve controller 86 detects this change in temperature $T_W$ of the mixed carrier fluid and adjusts the valve control signal $S_V$ as a consequence (increasing ramp in FIG. 5) until it goes back to oscillating around the value $S_{V0}$ corresponding to the desired operating condition.

Consequently, at a second time t1 the heat generator 23 provides the hot carrier fluid at the second temperature value $T_{H1}$, thus reducing the consumption of the heat generator 23, whereas the three-way valve 50 operates in the desired operating condition, obtaining a particularly efficient operating condition of the heating system 20.

Figure 6:
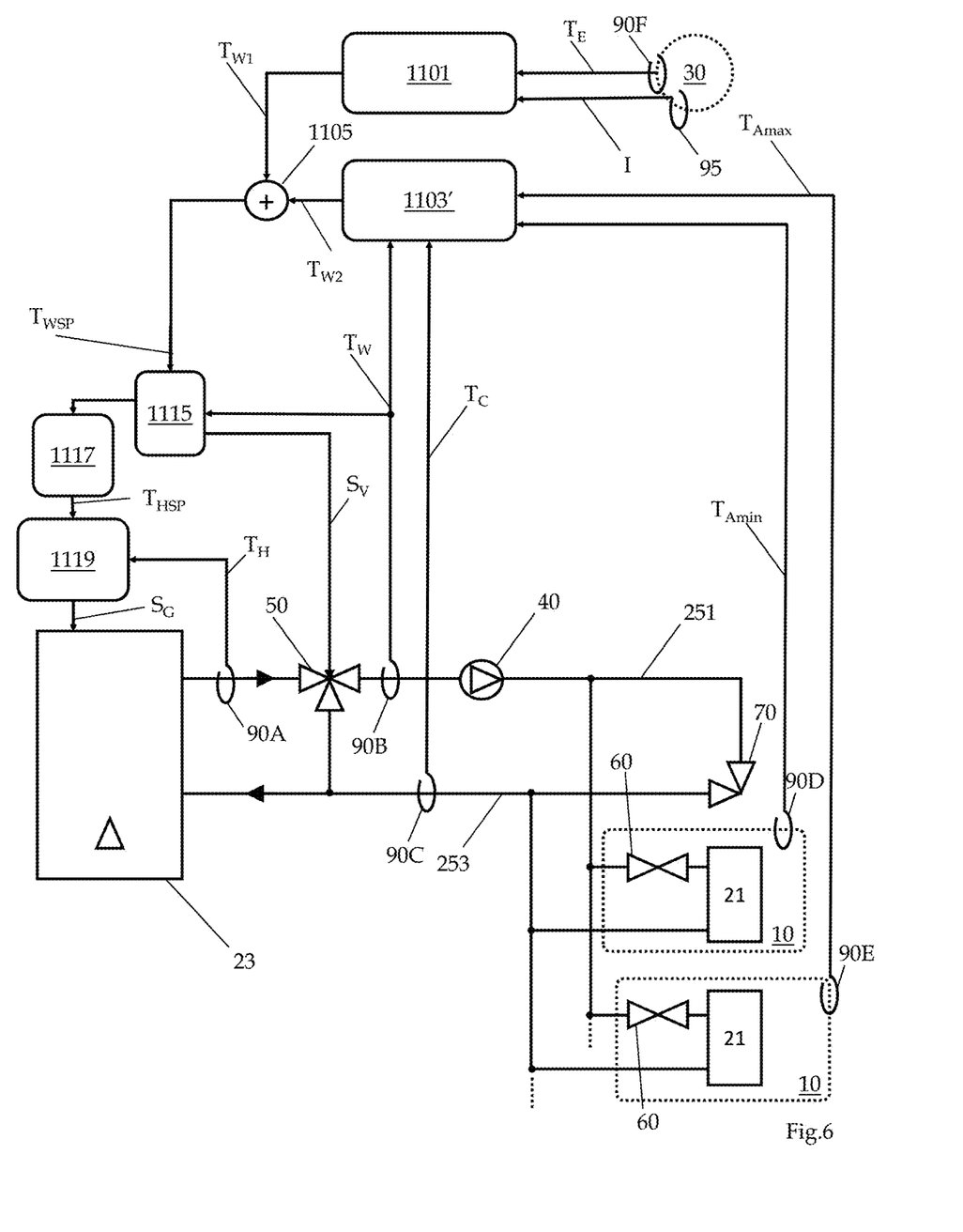
FIG. 6 is a flow diagram of an alternative control procedure able to be implemented by the control unit of the heating system of FIG. 2.

The flow diagram of FIG. 6 illustrates the operation of a heating system 20 according to an alternative embodiment of the present invention.

In particular, the heating system 20 does not provide for the controllers 85. In this case, the operation differs from what is described above in that the minimum room temperature $T_{Amin}$ and the maximum room temperature $T_{Amax}$ are acquired directly by the controller module 81 of the control unit 80 and are provided in input to a modified version of the control procedure 1103'. In detail, the modified control procedure 1103' provides for determining a perturbation to be applied, i.e. an adjustment temperature $TW_2$, such as to avoid a room temperature $T_A$ lower than the minimum room temperature $T_{Amin}$ or higher than the maximum room temperature $T_{Amax}$ being reached in one or more of the rooms 10.

The invention thus conceived can undergo numerous modifications and variants all of which are encompassed by the present invention as results from the attached claims.

For example, the heating system 20 can comprise other components like a hydraulic separator or decoupler arranged upstream of the three-way valve, one or more safety and/or venting valves to avoid over/under-pressures in the distribution network, filtering modules, decalcifiers, sludge remover, etc.

In an embodiment, many three-way valves can be arranged in the distribution network 25. For example, a three-way valve can be provided for each radiating element or group of radiating elements 21—like, a group of radiating elements arranged in a same room 10 of the building. In this case, the control unit 80 is configured to control the mixing of the carrier fluid in input and in output to/from each radiating element 21, or group of radiating elements 21, in accordance with corresponding room temperatures $T_A$.

Moreover, nothing prevents from processing the inputs provided to the control procedure 1103 with non-linear techniques—like, for example, the addition of hysteresis—or the use of on-line heuristics for data conditioning, like—for example—normalization, innovation threshold, max innovation, terminal constraint, etc. In this way it is possible to increase the reliability of the system in determining and following the optimal adjustment of the heating system 20.

Advantageously, the controllers 85, 86 and 87 can also implement optimisation methods and/or algorithms of its operating parameters, such as the P I D parameters. For example, the controllers can implement lambda-tuning methods or extremum seeking controls dedicated to seeking the optimum adjustment or tuning.

Furthermore, one or more of the controllers 85, 86 and 87 can be omitted, formed by one or more distributed modules or they can be implemented together with the processing module 81 in a single integrated electronic unit. Additionally, the operations of the control unit 70 can be implemented by carrying out instructions belonging to a single software block, possibly comprising a model predictive control. Finally, all of the details can be replaced by other technically equivalent elements.

In conclusion, the materials used, as well as the contingent shapes and sizes, can be whatever according to the specific implementation requirements without for this reason departing from the scope of protection of the following claims.

The invention claimed is:

1. A system for heating a building comprising:
a heat generator to heat a carrier fluid,
at least one radiating element for transferring heat to a thermal load included in a building,
a delivery conduit for transferring the carrier fluid from the heat generator to the radiating element,
a return conduit for transferring the carrier fluid from the radiating element to the heat generator,
a three-way valve arranged along the delivery conduit and connected to the return conduit, the three-way valve operable to mix the carrier fluid in the delivery conduit to the carrier fluid in the return conduit,
a plurality of temperature sensors arranged to measure the temperature of the carrier fluid and a temperature of the environment outside the building, and
a control unit operatively connected to the heat generator, the three-way valve and the temperature sensors,
wherein the control unit is configured for:
a) acquiring a temperature of the carrier fluid in the delivery conduit downstream of the three-way valve with respect to the direction of the flow of the carrier fluid in the delivery conduit,
b) acquiring a temperature of the carrier fluid in the return conduit upstream of the three-way valve with respect to the direction of the flow of the carrier fluid in the return conduit,
c) acquiring a temperature of the environment outside the building,
d) estimating a first target temperature of the carrier fluid in the delivery conduit downstream of the three-way valve, based on a simplified model of the system calculated as a function of the temperature of the external environment,
e) actuating at least one among the heat generator and the three-way valve to generate a periodic perturbation in the temperature of the carrier fluid downstream of the three-way valve,
f) determining a second target temperature of the carrier fluid in the delivery conduit downstream of the three-way valve based on a temperature difference between the temperature of the carrier fluid in the delivery conduit and the temperature of the carrier fluid in the return conduit based on said perturbation,
g) combining the first target temperature and the second target temperature to obtain a total target temperature,
h) actuating at least one among the heat generator and the three-way valve to bring the carrier fluid in the delivery conduit downstream of the three-way valve to the total target temperature, and
i) reiterating steps e) to h) until reaching a target temperature difference between the temperature of the carrier fluid in the delivery conduit and the temperature of the carrier fluid in the return conduit.

2. The system according to claim 1, wherein the control unit is configured for determining the second target temperature implementing a control not based on a model, selected among perturb and observe, extremum seeking and sliding mode.

3. The system according to claim 2, wherein the control unit is configured for identifying the achievement of the target temperature difference as a maximum or minimum point of the temperature difference between the temperature of the carrier fluid in the delivery conduit and the temperature as a function of the perturbation of the periodic perturbation in the temperature.

4. The system according to claim 1, wherein the control unit defines the simplified model as a relationship between the temperature difference of the carrier fluid in the conduits and the temperature of the carrier fluid in the delivery conduit adapted to the temperature of the environment outside the building.

5. The system according to claim 4, further comprising an irradiation sensor suitable for measuring a solar irradiation to which the building is subjected, and wherein the control unit is configured to modify the simplified model of the system based on the measured solar irradiation.

6. The system according to claim 4, wherein the control unit stores the temperature measurements of the carrier fluid and of the temperature of the outside environment, and is configured to define the simplified model of the system based on such stored measurements.

7. The system according to claim 4, wherein the control unit is configured for connecting to an external entity to acquire meteorological information, and modify the estimate of the first target temperature carried out based on the simplified model of the system based on the meteorological information.

8. The system according to claim 1, wherein the control unit is configured for:
detecting a temperature associated with at least one selected portion of the building, limiting the total target temperature to a first limit value or increasing the total target temperature to a second limit value to keep the temperature of the at least one selected portion of the building within a range of permitted values.

9. The system according to claim 8, wherein the control unit comprises a controller connected to a further sensor adapted to measure the temperature associated with the at least one selected portion of the building, the controller being configured for:
determining first limit value as an acceptable maximum value of the temperature of the carrier fluid in the delivery conduit that keeps the temperature of the selected portion of the building within a higher threshold value.

10. The system according to claim 9, wherein the temperature measured by the further sensor is associated with a portion of the building having an average temperature higher than an average temperature of the building.

11. The system according to claim 8, wherein the control unit comprises a second controller connected to a second further sensor adapted to measure a second temperature associated with at least one second selected portion of the building, the controller being configured for:
determining a second limit value as an acceptable minimum value of the temperature of the carrier fluid in the delivery conduit that keeps the temperature of the selected portion of the building within a lower threshold value.

12. The system according to claim 11, wherein the second temperature measured by the second further sensor is associated with a second selected portion of the building having an average temperature (lower than an average temperature of the building.

13. The system according to claim 1, wherein the control unit comprises a valve controller, connected to the three-way valve, configured for:
adjusting an operating condition of the three-way valve to mix the carrier fluid from the heat generator and the carrier fluid in the return conduit to obtain the carrier fluid in the delivery conduit downstream of the three-way valve at total target temperature.

14. The system according to claim 1, wherein the control unit comprises a temperature sensor connected to the delivery conduit for measuring a temperature of the carrier fluid output from the heat generator, and a generator controller, connected to the heat generator, to the valve controller and to the temperature sensor, the generator controller being configured for:
adjusting the operation of the heat generator to change the temperature of the carrier fluid output from the heat generator so as to obtain the carrier fluid in the delivery conduit downstream of the three-way valve at total target temperature with the three-way valve in a desired operating condition.

15. A method of controlling a system for heating a building, the system comprising a heat generator to heat a carrier fluid; at least one radiating element for transferring heat to a thermal load included in a building, a delivery conduit for transferring the carrier fluid from the heat generator to the radiating element, a return conduit for transferring the carrier fluid from the radiating element to the heat generator, and a three-way valve arranged along the delivery conduit and connected to the return conduit, the three-way valve operable to mix the carrier fluid in the delivery conduit to the carrier fluid in the return conduit, the method comprising the steps of:
a) acquiring a temperature of the carrier fluid in the delivery conduit downstream of the three-way valve with respect to the direction of the flow of the carrier fluid in the delivery conduit,
b) acquiring a temperature of the carrier fluid in the return conduit upstream of the three-way valve with respect to the direction of the flow of the carrier fluid in the return conduit,
c) acquiring a temperature of the environment outside the building,
d) estimating a first target temperature of the carrier fluid in the delivery conduit downstream of the three-way valve, based on a simplified model of the system calculated as a function of the temperature of the external environment,
e) actuating at least one among the heat generator and the three-way valve to generate a periodic perturbation in the temperature of the carrier fluid downstream of the three-way valve,
f) determining a second target temperature of the carrier fluid in the delivery conduit downstream of the three-way valve based on a temperature difference between the temperature of the carrier fluid in the delivery conduit and the temperature of the carrier fluid in the return conduit based on said perturbation,
g) combining the first target temperature and the second target temperature to obtain a total target temperature,
h) actuating at least one among the heat generator and the three-way valve to bring the carrier fluid in the delivery conduit downstream of the three-way valve at the total target temperature, and
i) reiterating steps e) to h) until a target temperature difference is reached between the temperature of the carrier fluid in the delivery conduit and the temperature of the carrier fluid in the return conduit.

\* \* \* \* \*